Patented June 4, 1929.

1,715,384

UNITED STATES PATENT OFFICE.

JAMES B. PIERCE, JR., OF CHARLESTON, WEST VIRGINIA.

METHOD OF MAKING PIGMENTS.

No Drawing.   Application filed November 10, 1924.   Serial No. 749,029.

This invention relates to the manufacture of pigments from bases, such for example as precipitated barium sulphate or blanc fixe, which of themselves possess little or no pigment value and has for its principal objects the effective utilization of such bases to produce highly valuable pigments having certain unique physical characteristics.

My investigations have led to the discovery that certain (colloidal or highly dispersed substances) such for example as zinc sulphide, are capable of imparting to base material as blanc fixe or precipitated barium sulphate, for example certain highly desirable properties which greatly enhance the value of such base material for various uses, especially for pigment purposes.

In carrying out the manufacture of my improved pigment, I preferably proceed as follows:—

A base which is capable of adsorbing colloidal or highly dispersed substances, such for example as the precipitated barium sulphate or blanc fixe prepared as described in the Patent No. 1,468,867 granted to me September 25th, 1923, or in my co-pending application No. 721,310 filed June 20th, 1924 is incorporated by means of a suitable mixer into a solution of a zinc salt and preferably in those cases where it is desired to introduce from 15% to 50% of zinc in the form of zinc sulphide into the blanc fixe or other base employed I employ zinc sulphate of a strength corresponding to a content of from 200 to 500 grams of zinc sulphate per liter.

The mixture of precipitated barium sulphate or blanc fixe in suspension in the zinc sulphate solution is now subjected to the action of hydrogen sulphide gas, the latter being caused to pass into the said mixture while subjecting the mass to stirring or agitation sufficient to insure the complete and rapid mixing of the ingredients, as well as the effective precipitation of zinc sulphide from the solution of zinc sulphate. By adhering to the foregoing procedure and notwithstanding the fact that concentration of the zinc sulphate employed is such as to result in a top liquor after the precipitation of the zinc sulphide of 16% $H_2SO_4$ content, it is possible to precipitate as much as an equal weight of zinc sulphide upon the precipitated barium sulphate prepared in accordance with the preferred process described in my aforesaid Patent No. 1.468,867 and pending application No. 721,310. If it be attempted, however, to precipitate zinc sulphide from a straight zinc sulphate solution by means of hydrogen sulphide gas passed into the same, it will be found that after the acid concentration of the top liquor reaches as much as 10% $H_2SO_4$ content, the further precipitation of zinc sulphide becomes extremely slow and for all practical purposes substantially ceases. I attribute the ability to precipitate the zinc as sulphide in a more strongly acid solution in the presence of my preferred precipitated barium sulphate or blanc fixe, to the fact that the zinc sulphide is held in combination with the base by adsorption or by some similar phenomenon, or both, and is in this way rendered insoluble in acid of higher strength than that in which it would be soluble without such a combination.

The foregoing may be further exemplified by following chemical equations

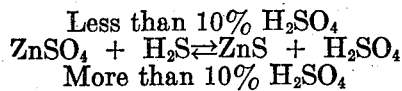

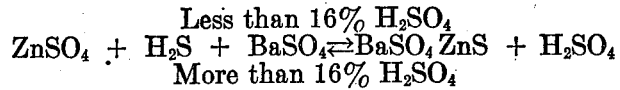

In carrying out my process after practically complete precipitation of the zinc as zinc sulphide, the top liquor of strong sulphuric acid is decanted off, concentrated to suitable strength and used to make more zinc sulphate by simply dissolving zinc spelter or other form of zinc in the concentrated acid. The precipitated pigment is then washed with pure water until practically all the acid has been removed, then filtered-pressed, dried, ignited to 800° C. or 900° C. for about one hour, quenched again, filtered, dried and disintegrated, preferably in an air-separator type mill, after which the pigment is ready for the market.

I have found when prepared as above and mixed with pure linseed oil and turpentine, my pigment, containing as little as 20% zinc sulphide has a remarkable covering power, being equal to or better than standard pigment such as lithopone containing 28% to 30% zinc as zinc sulphide, and under microscopic examination, to be fine and even of grain—the average maximum dimension of my particles being between one and two micromillimeters.

Furthermore, because of the fact that such zinc sulphide is held in combination with the base either by adsorption or by some similar phenomenon or both there is but a slight increase, if any, in the average maximum dimension of the particles of the pigment as compared with the average maximum dimension of the particles of the blanc fixe on which such zinc sulphide is precipitated in the form of the pigment.

As heretofore explained, my improved pigment consists principally of a base such as for example as barium sulphate (blanc fixe) having preferably a minor percentage of a pigment of a colloidal or highly dispersed nature such as zinc sulphide incorporated therewith in the manner herein described although in some cases it may be desired to have even as high as 50% of such zinc sulphide in the finished product.

Having thus described my invention, what I claim and desire to procure by United States Letters Patent is:—

1. The method of making a pigment from precipitated barium sulphate or blanc fixe, by suspending it in a solution of zinc sulphate, and passing hydrogen sulphide gas into said suspension to form zinc sulphide and sulphuric acid.

2. The method of making a pigment from precipitated barium sulphate or blanc fixe, by suspending it in a solution of zinc sulphate, passing hydrogen sulphide gas into said suspension to form a pigment composed of a barium sulphate base combined with a zinc sulphide pigment, by adsorption.

3. The method of making a pigment from precipitated barium sulphate or blanc fixe, by suspending it in a solution of zinc sulphate having a content of between 200 to 500 grams of zinc sulphate per liter, and passing hydrogen sulphide gas into said suspension to form zinc sulphide and sulphuric acid.

4. The method of making a pigment from a barium sulphate base, which consists in suspending such base in a solution of zinc sulphate and subjecting the mixture to the action of hydrogen sulphide, whereby a pigment composed of barium sulphate in combination with zinc sulphide is obtained.

Signed at Charleston, in the county of Kanawha and State of West Virginia, this 8th day of November, 1924.

JAMES B. PIERCE, JR.